US012614188B2

(12) United States Patent
Hu et al.

(10) Patent No.: US 12,614,188 B2
(45) Date of Patent: Apr. 28, 2026

(54) FAULT ANALYSIS FOR A PLURALITY OF APPLIANCES

(71) Applicant: Haier US Appliance Solutions, Inc., Wilmington, DE (US)

(72) Inventors: Haitian Hu, Louisville, KY (US); Hairong Li, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 212 days.

(21) Appl. No.: 18/450,165

(22) Filed: Aug. 15, 2023

(65) Prior Publication Data

US 2025/0061463 A1 Feb. 20, 2025

(51) Int. Cl.
G06Q 30/00 (2023.01)
G01M 99/00 (2011.01)
G06Q 30/014 (2023.01)

(52) U.S. Cl.
CPC ........ G06Q 30/014 (2013.01); G01M 99/005 (2013.01)

(58) Field of Classification Search
None
See application file for complete search history.

(56) References Cited

U.S. PATENT DOCUMENTS

2007/0279248 A1* 12/2007 Matsumoto ............ G08C 23/04
340/3.7
2008/0215176 A1* 9/2008 Borovinskih .......... G06Q 50/04
700/117

2010/0066552 A1* 3/2010 Salgueiro ............. G08B 29/123
340/650
2010/0169290 A1* 7/2010 McCoy ............... H04L 12/4625
709/219
2011/0054845 A1* 3/2011 Han .................... H04L 12/2825
702/185
2014/0164258 A1* 6/2014 Suzuki .................. G06Q 10/20
705/305
2016/0342720 A1* 11/2016 Veneris .................. G06F 30/20
2018/0112785 A1* 4/2018 Shaffer .................. F24H 15/12
(Continued)

FOREIGN PATENT DOCUMENTS

CN        111557626 A    8/2020
EP          2570744 A1   3/2013
KR      20190078685 A    7/2019

OTHER PUBLICATIONS

M. Herath, T. Thilakanayake, C. Angammana and M. Liyanage, "Appliance Anomaly Detection as NILM Extention," 2023 IEEE PES 15th Asia-Pacific Power and Energy Engineering Conference (APPEEC), Chiang Mai, Thailand, 2023 (Year: 2023).*
(Continued)

*Primary Examiner* — Matthew T Sittner
(74) *Attorney, Agent, or Firm* — Dority & Manning, P.A.

(57) ABSTRACT

A method of identifying a source of appliance faults includes receiving fault code data from a plurality of appliances, receiving manufacturing parameters from an identification board of each of the plurality of appliances, generating categorized fault code data by linking the fault code data with the manufacturing parameters, performing cluster analysis on the categorized fault code data to identify the source of appliance faults from the categorized fault code data, and implementing a responsive action upon identifying the source of appliance faults.

9 Claims, 5 Drawing Sheets

(56)         References Cited

U.S. PATENT DOCUMENTS

| | | | |
|---|---|---|---|
| 2018/0218881 A1* | 8/2018 | Brandon | H01J 37/32201 |
| 2019/0168045 A1* | 6/2019 | Griffin | A62C 3/006 |
| 2019/0278579 A1* | 9/2019 | Brian | G06F 8/65 |
| 2019/0309460 A1* | 10/2019 | Yoon | G05B 13/026 |
| 2019/0324078 A1* | 10/2019 | Chen | G01R 31/2825 |
| 2020/0104392 A1* | 4/2020 | Hong | G06F 11/3409 |
| 2021/0301455 A1* | 9/2021 | Leonard | D06F 33/34 |
| 2022/0093279 A1* | 3/2022 | Marinescu | G16Y 40/20 |
| 2022/0206911 A1 | 6/2022 | Endo et al. | |
| 2022/0247593 A1 | 8/2022 | Knatt et al. | |
| 2023/0021216 A1* | 1/2023 | Shilawat | H04L 63/1433 |
| 2023/0091693 A1 | 3/2023 | Chu | |

OTHER PUBLICATIONS

M. Alamyal, S. M. Gadoue and B. Zahawi, "Detection of induction machine winding faults using genetic algorithm," 2013 9th IEEE International Symposium on Diagnostics for Electric Machines, Power Electronics and Drives (SDEMPED), Valencia, Spain, 2013 (Year: 2013).*

* cited by examiner

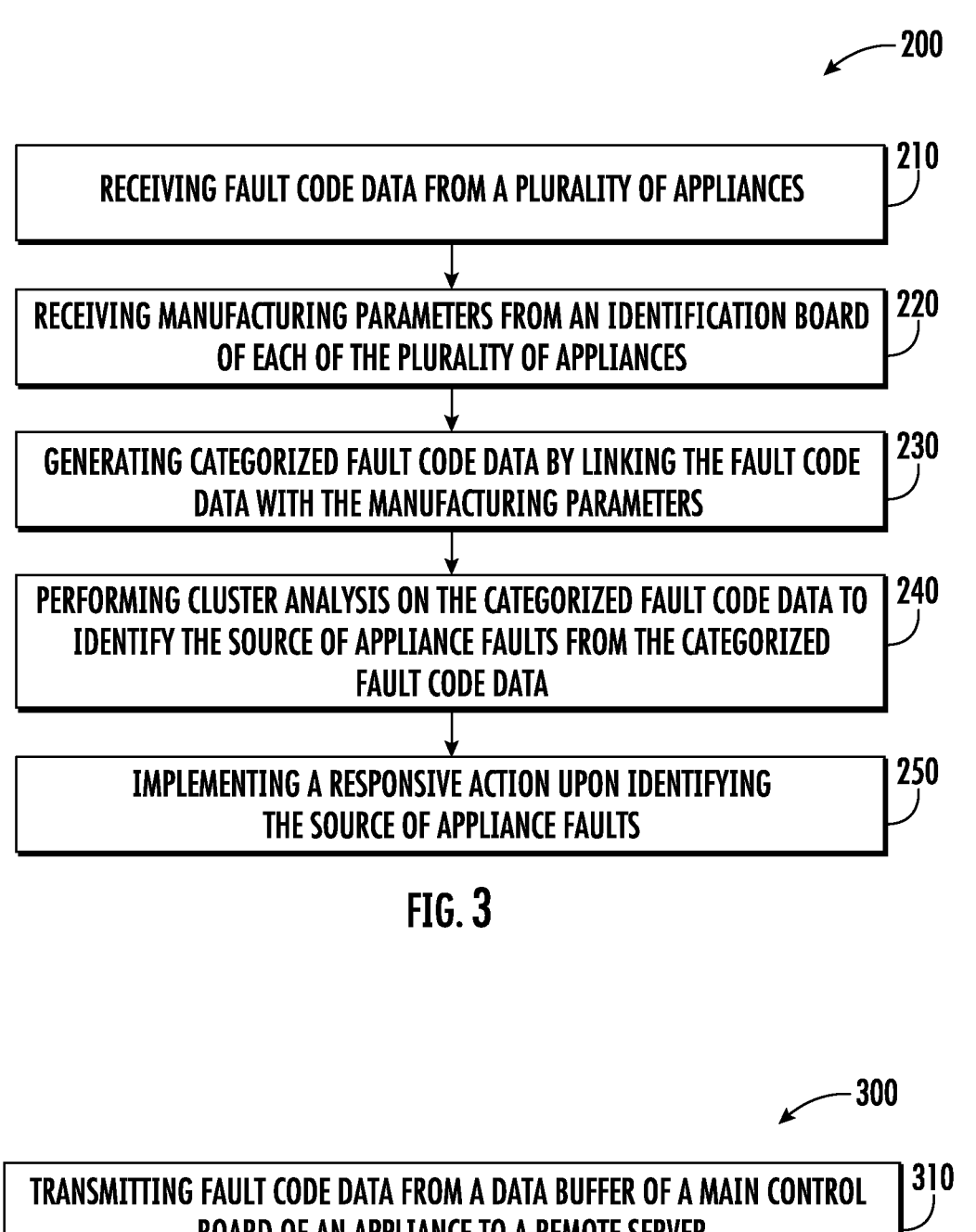

200

RECEIVING FAULT CODE DATA FROM A PLURALITY OF APPLIANCES  210

RECEIVING MANUFACTURING PARAMETERS FROM AN IDENTIFICATION BOARD OF EACH OF THE PLURALITY OF APPLIANCES  220

GENERATING CATEGORIZED FAULT CODE DATA BY LINKING THE FAULT CODE DATA WITH THE MANUFACTURING PARAMETERS  230

PERFORMING CLUSTER ANALYSIS ON THE CATEGORIZED FAULT CODE DATA TO IDENTIFY THE SOURCE OF APPLIANCE FAULTS FROM THE CATEGORIZED FAULT CODE DATA  240

IMPLEMENTING A RESPONSIVE ACTION UPON IDENTIFYING THE SOURCE OF APPLIANCE FAULTS  250

TRANSMITTING FAULT CODE DATA FROM A DATA BUFFER OF A MAIN CONTROL BOARD OF AN APPLIANCE TO A REMOTE SERVER  310

TRANSMITTING MAUFACTURING PARAMETERS FROM AN IDENTIFICATION BOARD OF THE APPLIANCE TO THE REMOTE SERVER  320

RECEIVING A NOTIFICATION FROM THE REMOTE SERVER THAT A TARGET APPLIANCE COMPONENT IS FAULTY OR NEEDS REPAIR  330

FIG. 4

FAULT ANALYSIS FOR A PLURALITY OF APPLIANCES

FIELD OF THE INVENTION

The present disclosure relates generally to fault monitoring in appliances, more particularly to a method for performing multi-dimensional fault analysis for a plurality of appliances.

BACKGROUND OF THE INVENTION

Conventional appliances inevitably experience operating issues, system faults, component failures, or general performance degradation. These issues may be a common cause of poor appliance performance, user dissatisfaction, and service calls. There are many reasons that any given appliance may experience such issues and identification of these issues is critical in order to facilitate repair or performance improvement. To speed up the process of quality issue detection/prediction, it is helpful to implement real time appliance monitoring.

However, conventional appliance monitoring relies on fixed error thresholds, and these error thresholds are typically set at a global level for specific issues with specific appliances. Thus, the monitoring is limited in scope and speed of deployment. Furthermore, sometimes even a quality problem is detected, the root cause of the problem is not clear or identifiable. For example, there may be a quality issue associated with a component provided by a specific supplier, during a certain time period, etc. In such a situation, even if the problem with the component is detected, identifying the root cause of that problem requires additional effort or is the root cause may not be identifiable at all.

Accordingly, a method for identifying the root cause of appliance issues would be desirable. More specifically, a method for identifying components issues at a global scale for a plurality of appliances would be particularly beneficial.

BRIEF DESCRIPTION OF THE INVENTION

Aspects and advantages of the invention will be set forth in part in the following description, may be apparent from the description, or may be learned through practice of the invention.

In one exemplary embodiment, a method of identifying a source of appliance faults is provided. The method includes receiving fault code data from a plurality of appliances, receiving manufacturing parameters from an identification board of each of the plurality of appliances, generating categorized fault code data by linking the fault code data with the manufacturing parameters, performing cluster analysis on the categorized fault code data to identify the source of appliance faults from the categorized fault code data, and implementing a responsive action upon identifying the source of appliance faults.

In another exemplary embodiment, a method of operating an appliance is provided. The appliance includes a main control board and an identification board, the main control board comprising a data buffer and the identification board comprising a permanent information segment and a modifiable information segment. The method includes transmitting fault code data from the data buffer of the main control board to a remote server, transmitting manufacturing parameters from the identification board to the remote server, and receiving a notification from the remote server that a target appliance component is faulty or needs repair.

In yet another exemplary embodiment, an appliance is provided including a main control board comprising a data buffer, an identification board comprising a permanent information segment and a modifiable information segment, and a controller in operative communication with the main control board, the identification board, and a remote server. The controller is configured to transmit fault code data from the data buffer of the main control board to a remote server, transmit manufacturing parameters from the identification board to the remote server, and receive a notification from the remote server that a target appliance component is faulty or needs repair.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

FIG. 3 provides a method for performing fault diagnostics using a remote server coupled to a plurality of appliances according to an example embodiment of the present subject matter.

FIG. 4 provides a method for performing fault diagnostics of an appliance according to an example embodiment of the present subject matter.

Figure 1:
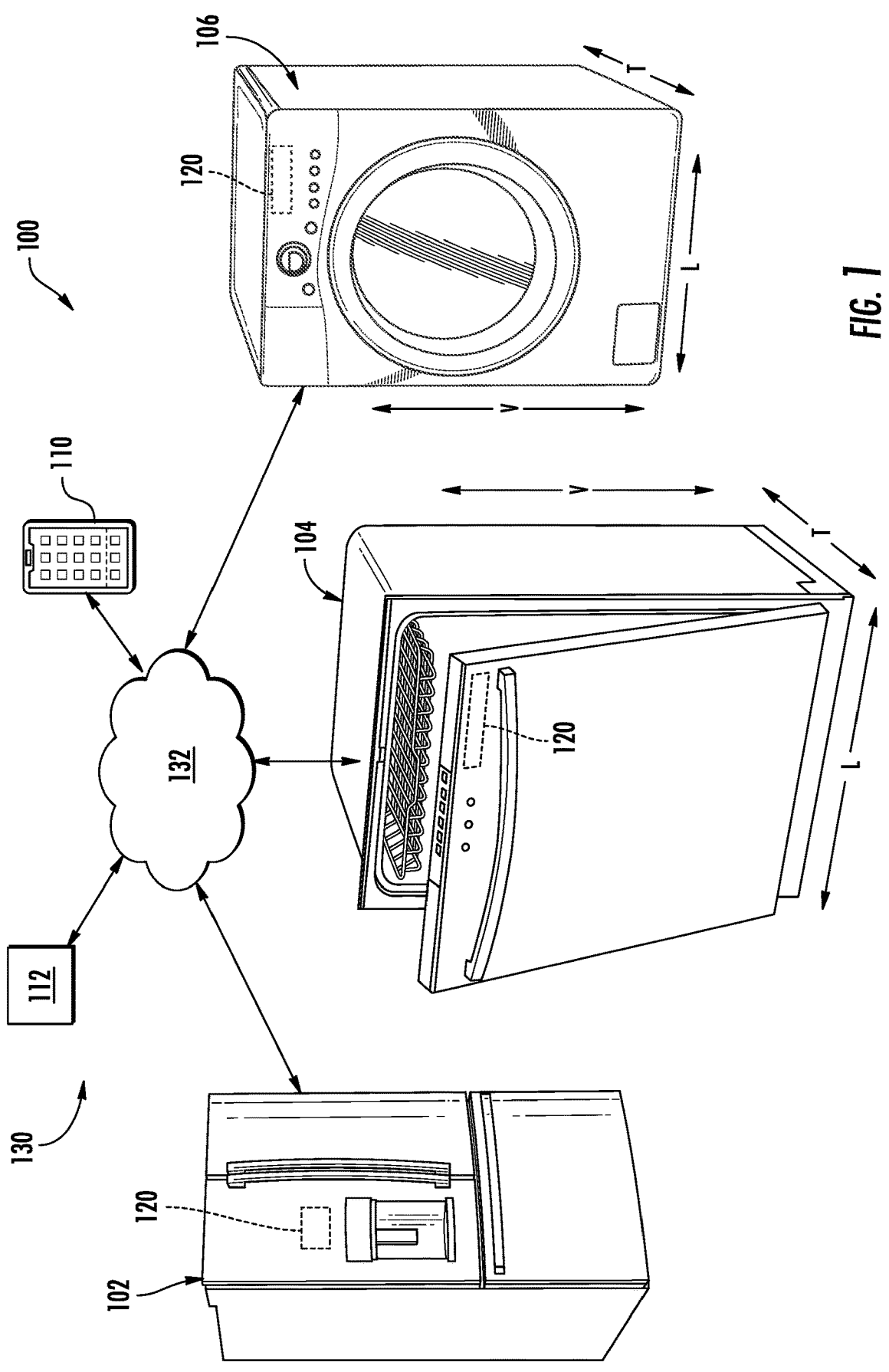
FIG. 1 provides a schematic view of a plurality of appliances connected to a remote server through an external network according to an example embodiment of the present subject matter.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined and/or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin, i.e., including values within ten percent greater or less than the stated value. In this regard, for example, when used in the context of an angle or direction, such terms include within ten degrees greater or less than the stated angle or direction, e.g., "generally vertical" includes forming an angle of up to ten degrees in any direction, e.g., clockwise or counterclockwise, with the vertical direction V.

Referring now to FIG. 1, a system of appliances 100 will be described according to exemplary embodiments of the present subject matter. In general, system of appliances 100 may include any suitable number, type, and configuration of appliances, remote servers, network devices, and/or other external devices. Some of these appliances 100 may be able to communicate with each other or are otherwise interconnected. This interconnection, interlinking, and interoperability of multiple appliances and/or devices may commonly be referred to as "smart home" or "connected home" appliance interconnectivity.

FIG. 1 illustrates system of appliances 100 according to exemplary embodiments of the present subject matter. As shown, system of appliances 100 generally includes a first appliance 102 (e.g., illustrated herein as a refrigerator appliance), a second appliance 104 (e.g., illustrated herein as a dishwasher), and a third appliance 106 (e.g., illustrated herein as a washing machine). Details regarding the operation of first appliance 102, second appliance 104, and third appliance 106 may be understood by one having ordinary skill in the art and detailed discussion is omitted herein for brevity. However, it should be appreciated that the specific appliance types and configurations are only exemplary and are provided to facilitate discussion regarding the use and operation of an exemplary system of appliances 100. The scope of the present subject matter is not limited to the number, type, and configurations of appliances set forth herein.

For example, the system of appliances 100 may include any suitable number and type of "appliances," such as "household appliances." These terms are used herein to describe appliances typically used or intended for common domestic tasks, e.g., such as the appliances as illustrated in the figures. According to still other embodiments, these "appliances" may include but are not limited to a refrigerator, a dishwasher, a microwave oven, a cooktop, an oven, a washing machine, a dryer, a water heater, a water filter or purifier, an air conditioner, a space heater, and any other household appliance which performs similar functions. Moreover, although only three appliances are illustrated, various embodiments of the present subject matter may also include another number of appliances, each of which may generate and store data.

In addition, it should be appreciated that system of appliances 100 may include one or more external devices, e.g., devices that are separate from or external to the one or more appliances, and which may be configured for facilitating communications with various appliances or other devices. For example, according to exemplary embodiments of the present subject matter, the system of appliances 100 may include or be communicatively coupled with a remote user interface device 110 that may be configured to enable user interaction with some or all appliances or other devices in the system of appliances 100.

In general, remote user interface device 110 may be any suitable device separate and apart from appliances (e.g., such as first appliance 102, second appliance 104, and third appliance 106) that is configured to provide and/or receive communications, information, data, or commands from a user. In this regard, remote user interface device 110 may be an additional user interface to the user interface panels of the various appliances within the system of appliances 100. In this regard, for example, the user interface device 110 may be a personal phone, a smartphone, a tablet, a laptop or personal computer, a wearable device, a smart home system, or another mobile or remote device. For example, the separate device may be a smartphone operable to store and run applications, also known as "apps," and the remote user interface device 110 be provided as a smartphone app.

In addition, as will be described in more detail below, some or all of the system of appliances 100 may include or be communicatively coupled with a remote server 112 that may be in operative communication with remote user interface device 110 and/or some or all appliances within system of appliances 100. Thus, user interface device 110 and/or remote server 112 may refer to one or more devices that are not considered household appliances as used herein. In addition, devices such as a personal computer, router, network devices, and other similar devices whose primary functions are network communication and/or data processing are not considered household appliances as used herein.

As illustrated, each of first appliance 102, second appliance 104, third appliance 106, remote user interface device 110, or any other devices or appliances in system of appliances 100 may include or be operably coupled to a controller, identified herein generally by reference numeral 120. As used herein, the terms "processing device," "computing device," "controller," or the like may generally refer to any suitable processing device, such as a general or special purpose microprocessor, a microcontroller, an integrated circuit, an application specific integrated circuit (ASIC), a digital signal processor (DSP), a field-programmable gate array (FPGA), a logic device, one or more central processing units (CPUs), a graphics processing units (GPUs), processing units performing other specialized calculations, semiconductor devices, etc. In addition, these "controllers" are not necessarily restricted to a single element but may include any suitable number, type, and configuration of processing devices integrated in any suitable manner to facilitate appliance operation. Alternatively, controller 120 may be constructed without using a microprocessor, e.g., using a combination of discrete analog and/or digital logic circuitry (such as switches, amplifiers, integrators, comparators, flip-flops, AND/OR gates, and the like) to perform control functionality instead of relying upon software.

Controller 120 may include, or be associated with, one or more memory elements or non-transitory computer-readable storage mediums, such as RAM, ROM, EEPROM, EPROM, flash memory devices, magnetic disks, or other suitable memory devices (including combinations thereof). These memory devices may be a separate component from the processor or may be included onboard within the processor. In addition, these memory devices can store information and/or data accessible by the one or more processors, including instructions that can be executed by the one or more processors. It should be appreciated that the instructions can be software written in any suitable programming language or can be implemented in hardware. Additionally, or alternatively, the instructions can be executed logically and/or virtually using separate threads on one or more processors.

For example, controller 120 may be operable to execute programming instructions or micro-control code associated with an operating cycle of an appliance. In this regard, the instructions may be software or any set of instructions that when executed by the processing device, cause the processing device to perform operations, such as running one or more software applications, displaying a user interface, receiving user input, processing user input, etc. Moreover, it should be noted that controller 120 as disclosed herein is capable of and may be operable to perform any methods, method steps, or portions of methods as disclosed herein. For example, in some embodiments, methods disclosed herein may be embodied in programming instructions stored in the memory and executed by controller 120. The memory devices may also store data that can be retrieved, manipulated, created, or stored by the one or more processors or portions of controller 120. The data can include, for instance, data to facilitate performance of methods described herein. The data can be stored locally (e.g., on controller 120) in one or more databases and/or may be split up so that the data is stored in multiple locations. In addition, or alternatively, the one or more database(s) can be connected to controller 120 through any suitable communication module, communication lines, or network(s).

Referring still to FIG. 1, a schematic diagram of an external communication system 130 will be described according to an exemplary embodiment of the present subject matter. In general, external communication system 130 is configured for permitting interaction, data transfer, and other communications between and among first appliance 102, second appliance 104, third appliance 106, remote user interface device 110, remote server 112, other appliances within system of appliances 100, and/or one or more external devices. For example, this communication may be used to provide and receive operating parameters, cycle settings, user instructions or notifications, performance characteristics, user preferences, or any other suitable information for improved performance of one or more appliances within system of appliances 100. In addition, it should be appreciated that external communication system 130 may be used to transfer data or other information to improve performance of one or more external devices or appliances and/or improve user interaction with such devices.

In addition, remote server 112 may be in communication with an appliance and/or remote user interface device 110 through a network 132. In this regard, for example, remote server 112 may be a cloud-based server 112, and is thus located at a distant location, such as in a separate state, country, etc. According to an exemplary embodiment, remote user interface device 110 may communicate with a remote server 112 over network 132, such as the Internet, to transmit/receive data or information, provide user inputs, receive user notifications or instructions, interact with or control the appliance, etc. In addition, remote user interface device 110 and remote server 112 may communicate with the appliance to communicate similar information.

In general, communication between an appliance, remote user interface device 110, remote server 112, and/or other user devices or appliances may be carried using any type of wired or wireless connection and using any suitable type of communication network, non-limiting examples of which are provided below. For example, remote user interface device 110 may be in direct or indirect communication with the appliance through any suitable wired or wireless communication connections or interfaces, such as network 132. For example, network 132 may include one or more of a local area network (LAN), a wide area network (WAN), a personal area network (PAN), the Internet, a cellular network, any other suitable short- or long-range wireless networks, etc. In addition, communications may be transmitted using any suitable communications devices or protocols, such as via Wi-Fi®, Bluetooth®, Zigbee®, wireless radio, laser, infrared, Ethernet type devices and interfaces, etc. In addition, such communication may use a variety of communication protocols (e.g., TCP/IP, HTTP, SMTP, FTP), encodings or formats (e.g., HTML, XML), and/or protection schemes (e.g., VPN, secure HTTP, SSL).

External communication system 130 is described herein according to an exemplary embodiment of the present subject matter. However, it should be appreciated that the exemplary functions and configurations of external communication system 130 provided herein are used only as examples to facilitate description of aspects of the present subject matter. System configurations may vary, other communication devices may be used to communicate directly or indirectly with one or more associated appliances, other communication protocols and steps may be implemented, etc. These variations and modifications are contemplated as within the scope of the present subject matter.

Figure 2:
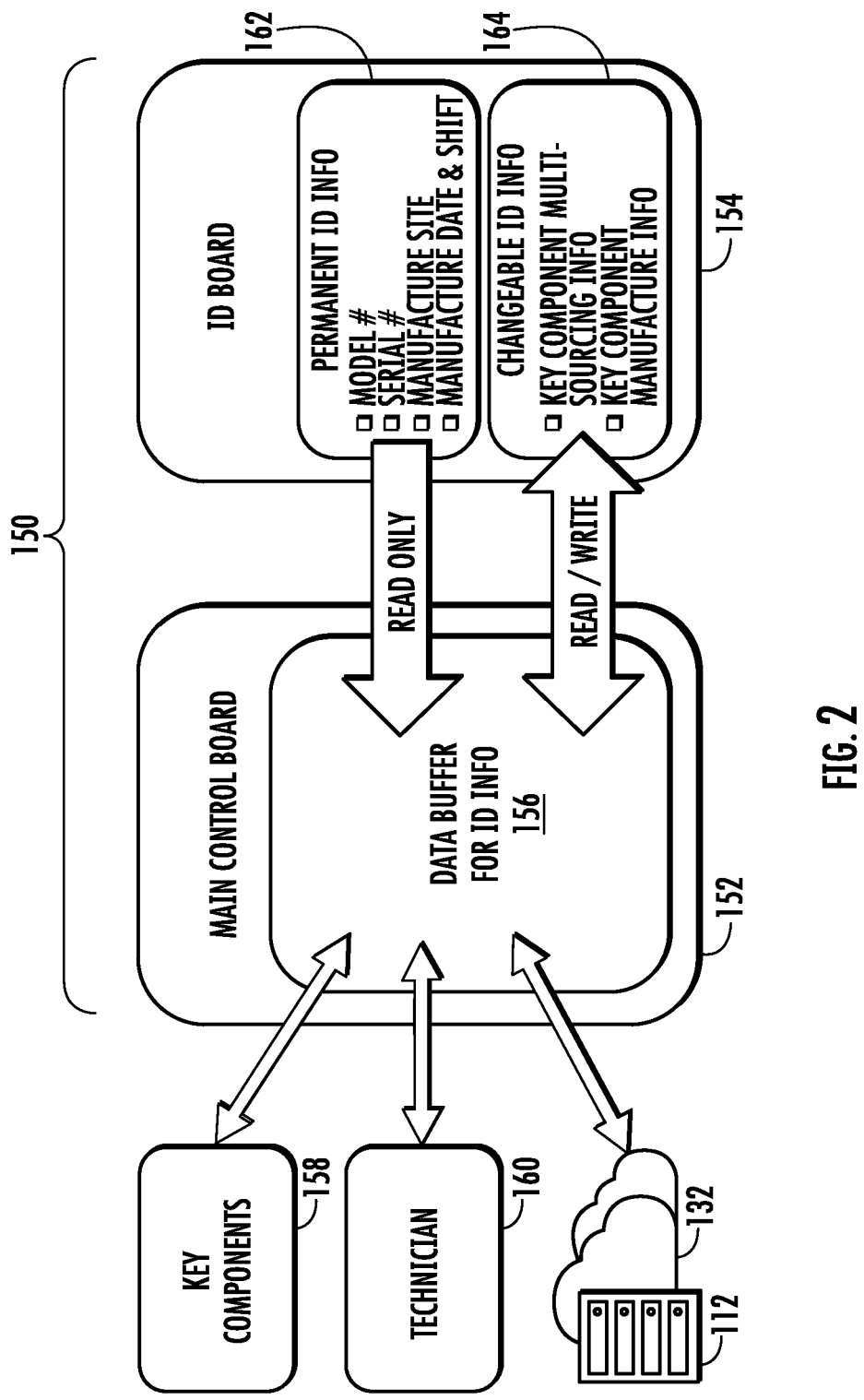
FIG. 2 provides a schematic view of a main control board and an identification board oven appliance according to an example embodiment of the present subject matter.

Referring now briefly to FIG. 2, each appliance 102-106 of system of appliances 100 may generally include onboard data storage (e.g., identified generally by reference numeral 150). For example, according to the illustrated embodiment, onboard data storage 150 may generally include a main control board 152 and an identification board 154. For example, main control board 152 and identification board 154 may both be housed on controller 120 of their respective appliance 102-106. According to still other embodiments, main control board 152 and identification board 154 may be discrete boards located at any suitable location within the respective appliance 102-106 and may be operably coupled through one or more communication channels.

As illustrated, main control board 152 may generally include a data buffer 156 that stores diagnostic data associated with operation of the respective appliance 102-106, such as fault code data as described in more detail below. As shown, main control board 152 may interface with external components or entities, such as appliance components 158, an appliance technician 160, or a remote server (e.g., such as remote server 112). In this manner, controller 120 may transmit fault code data or other diagnostics data to and from data buffer 156 of the main control board 152.

Notably, as illustrated, identification board 154 may generally include a permanent information segment 162 and a modifiable information segment 164. In general, permanent information segment 162 may include fixed information that should be permanently associated with the respective appliance 102-106, such as the appliance model number, serial number, manufacturing site, a manufacturing date and/or shift, etc. By contrast, modifiable information segment 164 may include information related to appliance components, such as multi-sourcing information or manufacturing information of a target appliance component. In general, modifiable information segment 164 may be modified when a specific component 158 of the respective appliance 102-106 is replaced, such that modifiable information segment 164 is updated with sourcing or manufacturing details related to the new component 158. In this manner, manufacturing parameters or other data related to the source of each appliance component 158 may be maintained.

Now that the construction of system of appliances 100 and external communication system 130 have been presented according to exemplary embodiments, an exemplary method 200 of performing fault diagnostics using a remote server coupled to a plurality of appliances will be described. Although the discussion below refers to the exemplary method 200 of performing fault diagnosis for system of appliances 100, one skilled in the art will appreciate that the exemplary method 200 is applicable to any other suitable number, type, and configuration of appliances and networks. In exemplary embodiments, the various method steps as disclosed herein may be performed by remote server 112, one or more controllers (e.g., such as controllers 120) or by a separate, dedicated controller that may be located locally on one or more of the appliances, remotely on a remote server, etc.

Figure 5:
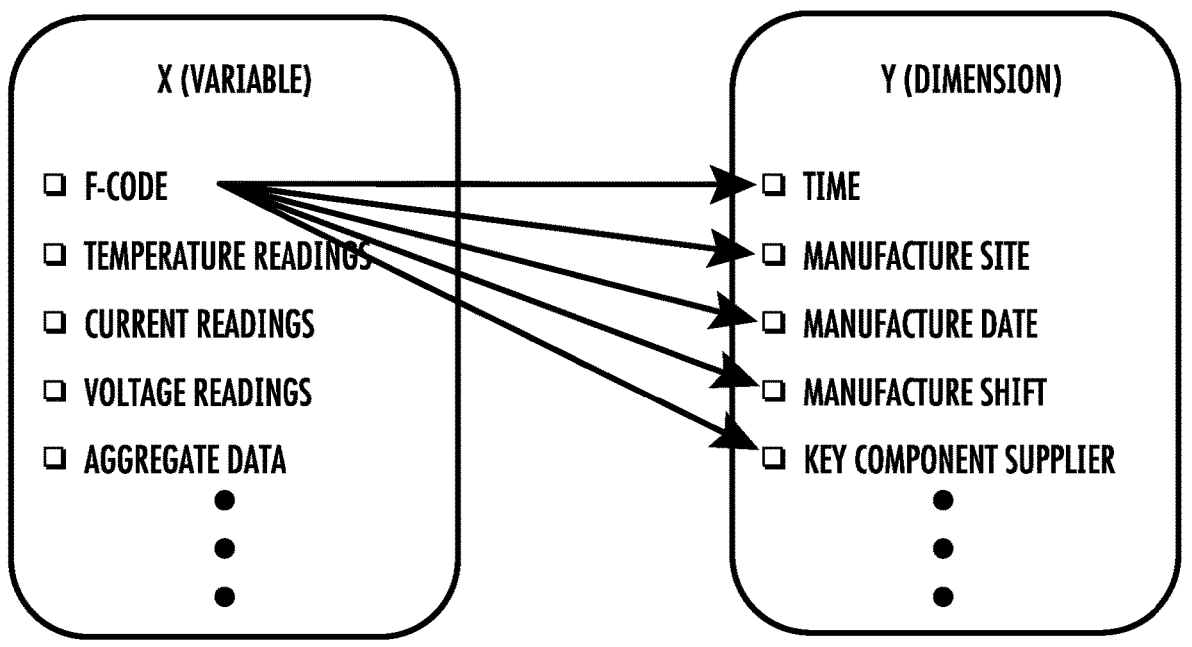
FIG. 5 provides an example of fault code variables and dimensions of an appliance according to an example embodiment of the present subject matter.

As shown, step 210 generally includes receiving fault code data from a plurality of appliances. In this regard, continuing the example from above, remote server 112 may continuously receive and monitor fault code data from each appliance 102-106. Remote server 112 may monitor this fault code data in order to identify common sources of problems and to generate global solutions to those problems. For example, referring briefly to FIG. 5, the fault code data may be identified generally as "variables" received from each appliance and may include fault codes, temperature readings, current readings, voltage readings, or other aggregate data received from one or more sensors of each appliance 102-106. As explained above, this fault code data may be retrieved from data buffer 156 of main control board 152 or from any other suitable source.

Step 220 includes receiving manufacturing parameters from an identification board of each of the plurality of appliances. Specifically, in addition to the fault code data, remote server 112 may receive manufacturing parameters associated with all the appliance components. For example, referring again briefly to FIG. 5, the manufacturing parameters may be identified generally as "dimensions" received from each appliance and may include the time when each component is manufactured, manufacturing site, a manufacturing date, the manufacturing shift, key component supplier data, or any other suitable data.

Figure 6:
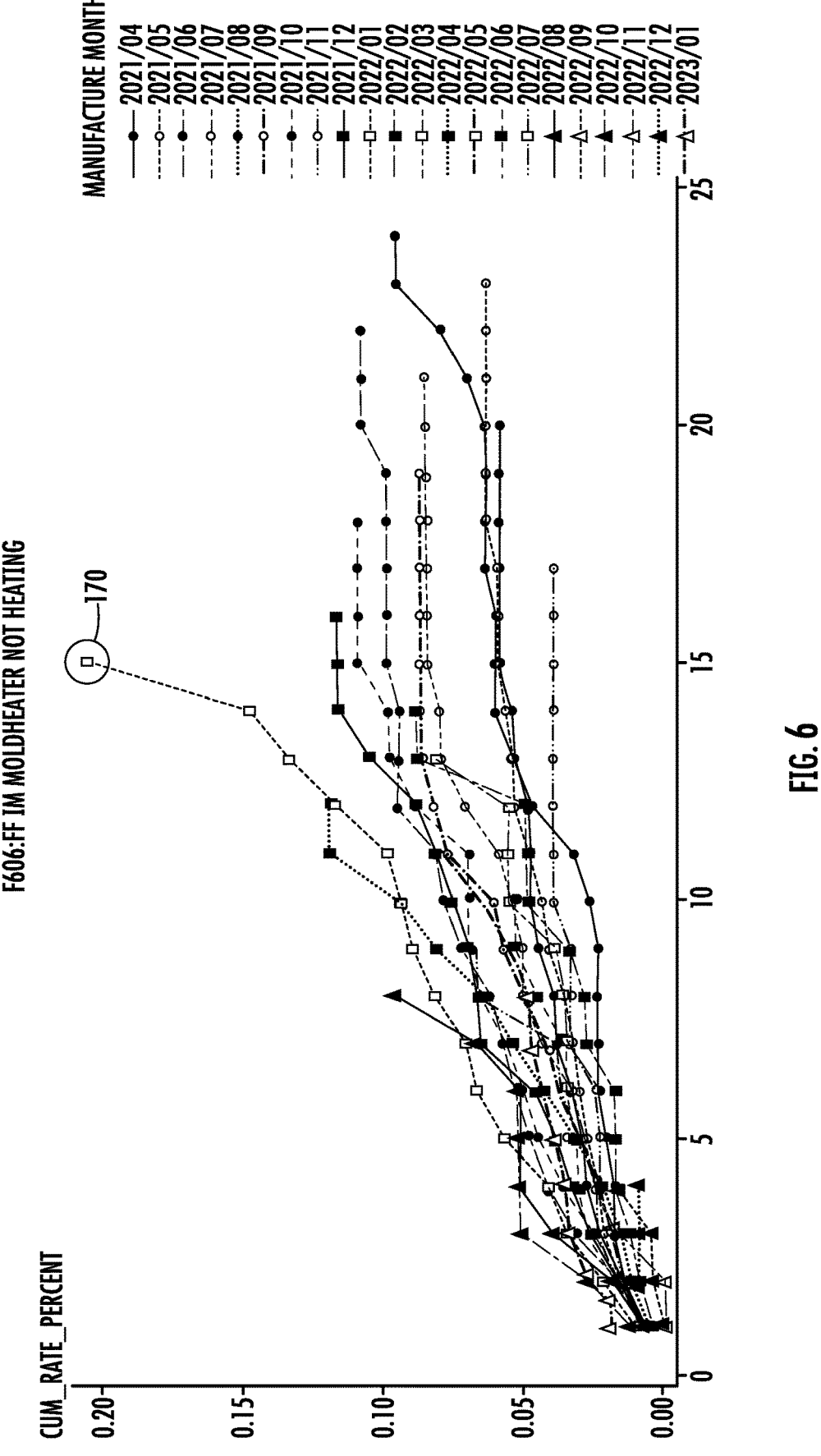
FIG. 6 provides a plot of fault code data gathered from a plurality of appliances according to an example embodiment of the present subject matter.

Step 230 generally includes generating categorized fault code data by linking the fault code data (e.g., as obtained at step 210) with the manufacturing parameters (e.g., as obtained at step 220). In this regard, as illustrated schematically in FIG. 5, for example with respect to each fault code, the fault code data may be categorized by each dimension or manufacturing parameter associated with the appliance components. For this reason, the categorized fault code data may be referred to generally herein as multidimensional data that may facilitate multidimensional cluster analysis as described below. Specifically, referring now briefly to FIG. 6, exemplary categorized fault code data is plotted over time and is categorized by manufacturing month. Notably, once this data is categorized by variable and dimension, the analysis may be performed on the categorized data to readily identify trends, common failures, or sources of component and/or appliance failures.

Specifically, step 240 may include performing cluster analysis on the categorized fault code data to identify the source of appliance faults from the categorized fault code data. For example, performing cluster analysis may be useful in identifying a source of appliance faults (e.g., identified generally in FIG. 6 by reference numeral 170). In general, the term "cluster analysis" and the like may generally refer to data analysis techniques that identify and explore naturally occurring groups within a data set (e.g., "clusters") and identifying data points that fall outside of the normal trends or clusters. It should be appreciated that any suitable method for performing cluster analysis may be used while remaining within the scope of the present subject matter. For example, cluster analysis may be used to find a running average and standard deviation of cluster data and identifying when data deviates substantially from a predetermined range relative to that cluster data. For example, performing the cluster analysis on the categorized fault code data to identify the source of appliance faults from the categorized fault code data may include identifying a dynamic threshold range for the categorized fault code data and determining that the source of appliance faults falls outside of the dynamic threshold range.

Step 250 generally includes implementing a responsive action upon identifying the source of appliance faults. In this regard, method 200 may be used to identify a particular component that is causing issues and one or more appliances. Upon identifying the source of appliance faults, the remote server may aggregate data related to all appliances that use the component associated with the fault. For example, the cluster analysis performed in step 240 may identify a specific control board, compressor, capacitor, or other electronic components manufactured by a particular manufacturer on a particular day that are causing appliance failures. Remote server 112 may then initiate a recall of the component or associated appliances or may otherwise schedule maintenance visit or notify the user of the appliance.

Referring now briefly to FIG. 4, a method 300 for performing fault diagnostics of an appliance will be described according to an example embodiment of the present subject matter. It should be appreciated that some or all of the steps of method 300 may be the same or similar to steps of method 200, e.g., depending on the perspective from which the data is being transferred, and vice versa. Specifically, step 310 may include transmitting fault code data from a data buffer of the main control board of an appliance to a remote server. In this regard, continuing the example from above, each appliance 102-106 may transmit fault code data from data buffers 156, respectively, to remote server 112.

Step 320 may include transmitting manufacturing parameters from an identification board of the appliance to the remote server. In this regard, continuing the example from above, manufacturing parameters from the permanent information segment 162 and/or modifiable information segment

164 may be transmitted from identification board 154 to remote server 112. Step 330 may include receiving a notification from the remote server that a target appliance component is faulty or needs repair. In this regard, the remote server 112 may aggregate data from all appliances 102-106 and may generate categorized fault code data from which cluster analysis may be performed and source of appliance faults may be identified. In this regard, the remote server 112 may identify the target appliance component that is faulty or needs repair and may initiate a recall, notify the user, etc.

According to example embodiments, method 300 may further include determining that a replacement component has replaced the target appliance component, updating the data buffer with manufacturing parameters associated with the replacement component, and writing the manufacturing parameters associated with the replacement component onto the modifiable segment of the identification board. In this regard, when an appliance component is replaced, it may be desirable to update the modifiable information segment 164 with respect to the new appliance component for subsequent data analysis and fault code diagnosis.

In addition, it may be necessary to periodically replace main control board 152 and/or identification board 154. Accordingly, method 300 may further include determining that a new main control board has replaced the main control board and synchronizing data from the identification board onto a data buffer of the new main control board. By contrast, method 300 may include determining that a new identification board has replaced the identification board and synchronizing data from a data buffer of the main control board to the new identification board. Notably, this may be the only time that permanent information segment 162 may be updated, and the method may further include locking the permanent information segment of the new identification board after synchronization, e.g., to prevent further modification.

FIGS. 3 and 4 depict exemplary control methods having steps performed in a particular order for purposes of illustration and discussion. Those of ordinary skill in the art, using the disclosures provided herein, will understand that the steps of any of the methods discussed herein can be adapted, rearranged, expanded, omitted, or modified in various ways without deviating from the scope of the present disclosure. Moreover, although aspects of these methods are explained using appliances 102-106 and remote server 112 as an example, it should be appreciated that these methods may be applied to the fault diagnosis of any suitable appliance or system of appliances.

As explained herein, aspects of the present subject matter are generally directed to a method to predict quality problems through the detection of abnormal trends for both single appliance and groups of appliances based on in-cloud cluster analysis. Multidimensional cluster analysis maximizes both within-group similarities and between-group differences based on the design of embedded appliance identification board and data buffer. Cluster analysis can be one-dimensional or multi-dimensional. One-dimension cluster analysis is done based on one item from x category (variable) and one item from y category (dimension). Multi-dimensional cluster analysis will consider the data stored in the embedded appliance identification board. An appliance's identification board may be initialized in factory. Its permanent and modifiable data make it easy to accommodate key component replacements: when a component is replaced in an appliance, related information will be written into the appliance's identification board. Permanent ID Information (information that is unique to an appliance when it is built) written into the new identification board may NOT be changed after the synchronization.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method of identifying a source of appliance faults, the method comprising:

receiving fault code data from a plurality of appliances, wherein each of the appliances comprises an identification board and a controller, the identification board having a permanent information segment, and wherein the identification board of each of the plurality of appliances comprises a modifiable information segment that comprises at least one of multi-sourcing information or manufacturing information of a target appliance component, and wherein the modifiable information segment is modifiable when the target appliance component is replaced or repaired;

receiving manufacturing parameters from the identification board of each of the plurality of appliances;

generating categorized fault code data by linking the fault code data with the manufacturing parameters;

performing cluster analysis on the categorized fault code data to identify the source of appliance faults from the categorized fault code data;

implementing a responsive action upon identifying the source of appliance faults; and preventing, using the controller of each respective appliance of the plurality of appliances, modification of the permanent information segment of the identification board.

2. The method of claim 1, wherein the fault code data comprises data related to a fault of one or more common components used in each of the plurality of appliances.

3. The method of claim 1, wherein the fault code data comprises sensor data from the plurality of appliances, the sensor data comprising at least one of temperature readings, current readings, or voltage readings.

4. The method of claim 1, wherein the fault code data and the manufacturing parameters are received at a remote server, wherein each of the plurality of appliances are in operative communication with the remote server through an external network.

5. The method of claim 1, wherein the identification board of each of the plurality of appliances comprises a permanent information segment that comprises data related to at least one of an appliance model number, an appliance serial number, a manufacturing site, a manufacturing date, or a manufacturing shift.

6. The method of claim 1, wherein generating the categorized fault code data by linking the fault code data with the manufacturing parameters comprises:

sorting the fault code data associated with a target appliance component by each parameter of the manufacturing parameters.

7. The method of claim 1, wherein performing the cluster analysis on the categorized fault code data to identify the source of appliance faults from the categorized fault code data comprises:

identifying a dynamic threshold range for the categorized fault code data; and determining that the source of appliance faults falls outside of the dynamic threshold range.

8. The method of claim 1, wherein implementing the responsive action upon identifying the source of appliance faults comprises:

identifying each appliance of the plurality of appliances that includes a target appliance component corresponding to the source of appliance faults.

9. The method of claim 1, wherein implementing the responsive action upon identifying the source of appliance faults comprises:

initiating a recall a target appliance component corresponding to the source of appliance faults.

* * * * *